United States Patent
Saxena et al.

(10) Patent No.: US 11,060,682 B1
(45) Date of Patent: *Jul. 13, 2021

(54) ARCHITECTURE AND METHOD FOR AIRCRAFT LIGHTING SYSTEM USING A CENTRALIZED BLUE LIGHT SOURCE AND A PLURALITY OF DISTRIBUTED PASSIVE LIGHT-HEADS

(71) Applicant: HONEYWELL INTERNATIONAL INC., Charlotte, NC (US)

(72) Inventors: Sunit Kumar Saxena, Bangalore (IN); Anita Sure, Bangalore (IN); Gowtham Vankayala, Bangalore (IN); William Tyson, III, Plain City, OH (US)

(73) Assignee: HONEYWELL INTERNATIONAL INC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,420

(22) Filed: Nov. 10, 2020

(30) Foreign Application Priority Data

Jan. 23, 2020 (IN) .............................. 202011003066

(51) Int. Cl.
*F21S 41/16* (2018.01)
*F21S 41/176* (2018.01)
(Continued)

(52) U.S. Cl.
CPC .............. *F21S 41/16* (2018.01); *B64D 47/06* (2013.01); *F21S 41/176* (2018.01); *F21S 41/24* (2018.01);
(Continued)

(58) Field of Classification Search
CPC ........... B64D 47/02–06; B64D 2203/00; F21S 41/16; F21S 41/176; F21S 41/24;
(Continued)

(56) References Cited

U.S. PATENT DOCUMENTS 5,690,408 A    11/1997  de la Pena et al.
6,056,426 A     5/2000  Jenkins
(Continued)

FOREIGN PATENT DOCUMENTS

EP    3072817 B1    9/2017

OTHER PUBLICATIONS

"Fiber Optic Lighting for Aircraft, Laser Based Fiber Optic Illumination and its Application on Aircraft," Fiber Optic Lighting for Aircraft—EE Publishers, Sep. 9, 2019, https://www.ee.co.za/article/fiber-optic-lighting-for-aircraft.html.

*Primary Examiner* — Jason M Han
(74) *Attorney, Agent, or Firm* — Lorenz & Kopf, LLP (57) ABSTRACT

Provided systems and methods for an aircraft lighting system (ALS) include a centralized blue generator that supplies blue light to a plurality (N) of passive light-heads distributed at various locations on the aircraft. A load profile for use of the N passive light-heads during all flight phases and operational phases is developed and uploaded into the system. Each of the passive light-heads is operationally coupled to the blue light generator via a respective light transmission element that is gated with a respective one of N light switches. A light generating control unit (LGCU) is coupled to the blue light generator, and controls the generation and actuation of blue light, in addition to controlling light switch positions, as a function of navigation data and the load profile. Each of the N passive light-heads comprises a respective light conversion element to convert the blue light into red, green, or white light.

20 Claims, 7 Drawing Sheets

(51) Int. Cl.
*F21S 43/16* (2018.01)
*F21V 23/04* (2006.01)
*F21S 41/24* (2018.01)
*F21S 43/243* (2018.01)
*F21S 43/247* (2018.01)
*B64D 47/06* (2006.01)
*F21S 43/237* (2018.01)
*F21W 107/30* (2018.01)

(52) U.S. Cl.
CPC ............ *F21S 43/16* (2018.01); *F21S 43/237* (2018.01); *F21S 43/243* (2018.01); *F21S 43/247* (2018.01); *F21V 23/04* (2013.01); *B64D 2203/00* (2013.01); *F21W 2107/30* (2018.01)

(58) Field of Classification Search
CPC . F21S 43/16; F21S 43/235–251; F21V 23/04; F21W 2107/30
USPC .......................................... 362/470, 510–511
See application file for complete search history.

(56) References Cited

U.S. PATENT DOCUMENTS

| | | |
|---|---|---|
| 6,439,751 B1 | 8/2002 | Jones et al. |
| 10,141,533 B2 | 11/2018 | Sam et al. |
| 10,295,720 B2 | 5/2019 | Saul et al. |
| 2014/0028189 A1 | 1/2014 | Eckel et al. |
| 2015/0341113 A1 | 11/2015 | Krug |
| 2019/0032890 A1 | 1/2019 | Nakano |
| 2019/0097722 A1 | 3/2019 | McLaurin et al. |

ARCHITECTURE AND METHOD FOR AIRCRAFT LIGHTING SYSTEM USING A CENTRALIZED BLUE LIGHT SOURCE AND A PLURALITY OF DISTRIBUTED PASSIVE LIGHT-HEADS

CROSS REFERENCE TO RELATED APPLICATION

This application claims priority to Indian Provisional Patent Application No. 202011003066, filed Jan. 23, 2020, the entire content of which is incorporated by reference herein.

TECHNICAL FIELD

The technical field generally relates to aircraft lighting systems (ALS), and more particularly relates to an ALS using a centralized blue light source and a plurality of distributed passive light-heads.

BACKGROUND

The exterior surface of an aircraft is often exposed to severe environmental conditions. For example, it is not uncommon for the exterior of the aircraft to be exposed to thermal temperatures ranging from −55° C. to 85° C., and for the exterior of the aircraft to experience a rapid rate of change of temperature within that range, such as 10° C./min. In addition to the temperature swings, the exterior of the aircraft can be exposed to high vibration levels, typically in the range of 13.9 g. The vibration levels can be significant; the wingtips can experience vibrations exceeding 100 G units (m/s$^2$). The exterior of the aircraft can be exposed to other harsh environmental conditions also, including weather conditions, such as: electromagnetic interferences, humidity, water, moisture, fluids, salt spray, icing/freezing rain, acidic environment; sand and dust; direct lightning, P-static, an explosive atmosphere, and solar radiation.

The harsh environmental conditions exact a toll on components that are located on the exterior of the aircraft, such as the components of an aircraft lighting system (ALS). A technical problem is presented in that the harsh environmental conditions can result in deleterious effects on the performance and lifespan of the components of the ALS.

Therefore, technologically improved architectures and methods for the ALS are desired. The desired ALS employs a strategy that protects a blue light source and its controller components from the harsh environmental conditions and utilizes a plurality of distributed passive light-heads. Other desirable features and characteristics of the herein described embodiments will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is an aircraft lighting system (ALS) for an aircraft, comprising: a central light source subsystem including a blue light generator, the blue light generator controlled by a light generator control unit (LGCU); a plurality of passive light heads, distributed around the aircraft, and a respective plurality of light transmission elements; each light transmission element operationally coupled on a first side to the blue light generator; each light transmission element operationally coupled on a second side to an associated passive light head of the plurality of passive light heads; wherein the LGCU is coupled to the central light source subsystem and the LGCU configured to: command the blue light generator to generate blue light in accordance with an aircraft load profile and to generate blue light in accordance with input from other on-board systems, including a navigation system, a sensor system, and a flight management system; wherein each of the plurality of passive light heads comprises a respective light conversion element, and at least one of the light conversion elements converts received blue light to aviation green light, at least one of the plurality of light conversion elements converts received blue light to aviation red light, and at least one of the plurality of light conversion elements converts received blue light to aviation white light.

Also provided is a method for aircraft lighting system (ALS) in an aircraft, comprising: locating a central light source subsystem including a blue light generator and a light generating control unit (LGCU) comprising a processor, on the aircraft; distributing a plurality of passive light-heads around an external surface of the aircraft; operationally coupling a light transmission element on a first side to the blue light generator; operationally coupling each light transmission element on a second side to a passive light head of the plurality of passive light heads; coupling the LGCU to the central light source subsystem; uploading a load profile needed for the functionality of passive light-heads into the LGCU; receiving navigation data and processing it with the load profile in the LGCU; commanding, by the LGCU, as a function of the load profile and data from aircraft on-board systems, the blue light generator to generate blue light; and wherein each of the plurality of passive light heads comprises a respective light conversion element, converting, by at least one of the light conversion elements, received blue light to aviation green light, converting, by at least one of the light conversion elements, received blue light to aviation red light, and converting, by at least one of the light conversion elements, received blue light to aviation white light.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, harsh environmental conditions exact a toll on components that are located on the exterior of the aircraft, such as the components of an aircraft lighting system (ALS). A result of these harsh environmental conditions is that failure rates of individual components can increase, and the overall robustness of the ALS can be affected. Another result of these harsh environmental conditions is that, due to such physical environmental and operational limitations, in some scenarios, the light emitting components of an ALSs cannot be positioned at all locations that are deemed to have significant impacts on visibility and safety of the aircraft operation. An example of a location that is deemed to have a significant impact on visibility and safety is the engine. Accordingly, a technical problem is presented in that the harsh environmental conditions can result in deleterious effects on the performance, operation, and lifespan of the components of the ALS.

One approach to compensate for the harsh environmental conditions is the construction of suitable housings for components of the ALS, such as by providing more material hardening and ruggedization. A drawback of this approach is a higher product cost. Another approach to compensate for the harsh environmental conditions is the scheduling more frequent inspections (and subsequent repairs) of the ALS, which also leads to higher cost.

Figure 1:
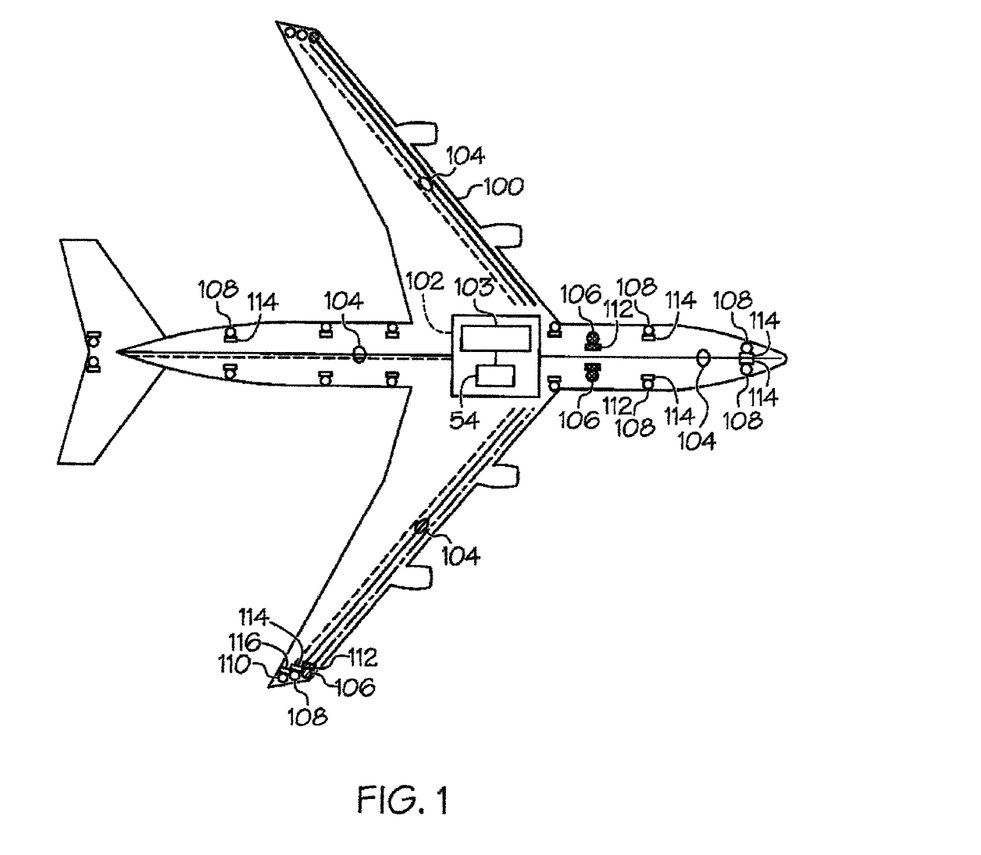
FIG. 1 is a diagram of an aircraft with an aircraft lighting system, in accordance with an exemplary embodiment.

Exemplary embodiments of the technologically improved aircraft lighting system ALS architecture comprise a centralized light source sub-system and a plurality of passive light-heads distributed at various aircraft locations (FIG. 1, 102, also referred to herein as "aircraft lighting system 102," "ALS 102," and simply, "system" 102) are provided. The ALS 102 is generally located in a mobile platform (FIG. 1, 100). In various embodiments, the mobile platform 100 is an aircraft, and is referred to as aircraft 100. Exemplary embodiments of the technologically improved aircraft lighting system 102 provide a technical solution to the described technical problem in the form of a centralized light source sub-system and a plurality of distributed passive light-heads.

Turning now to FIG. 1, an aircraft 100 with an aircraft lighting system (ALS) 102 is depicted. The system 102 operationally couples a central light source subsystem 103, having therein a blue light generator 54, to a plurality of passive light-heads (106, 108, 110) via an optical fiber cable (OFC) bus 104. The central light source subsystem 103 locates a control module in a location that is protected from the harsh environment, especially as compared to the locations of the plurality of passive light-heads. In an embodiment, the plurality of passive light-heads is distributed around an external surface of the aircraft 100, and include: white light-heads 108, red light-heads 106, and green light-heads 110. In various embodiment, the green light-head (110) nav light is on right wing tip and the red light-head (106) nav light is on the left wing tip.

In various embodiments, the passive light-heads are each members of one or more exterior aircraft lighting sub-systems, such as position lights (left, right and aft), anti-collision lights (WACLs and FACLs), High power Flood lights (Landing, Taxi and Runway turn off etc.,), Medium power flood lights (Wing illumination, cargo load light and logo light etc.,), Low Power Flood lights (Cargo service lights), and the like.

In various embodiments, the white light-heads 108 are coupled to a white light conversion element 114; the red light-heads 106 are coupled to a red light conversion element 112; the green light-heads 110 are coupled to a green light conversion element 116. The optical fiber cable bus may include transmission elements; the transmission elements may transmit continuous blue laser light or flashing blue laser light to the passive light-heads. A more detailed description of these functional blocks is provided in connection with FIGS. 2-7.

Figure 2:
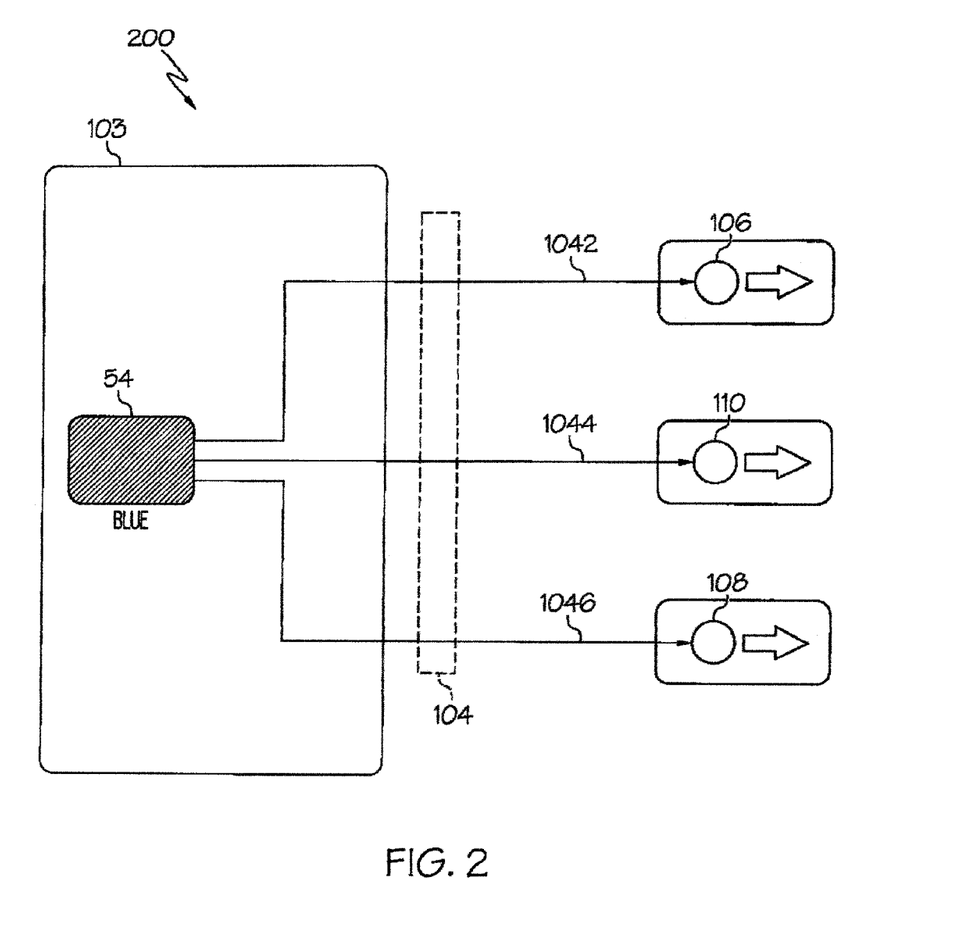
FIG. 2 is a functional block diagram showing a central light source supplying light to a passive red, passive green, and passive white, light-head, in accordance with an exemplary embodiment.
Figure 7:
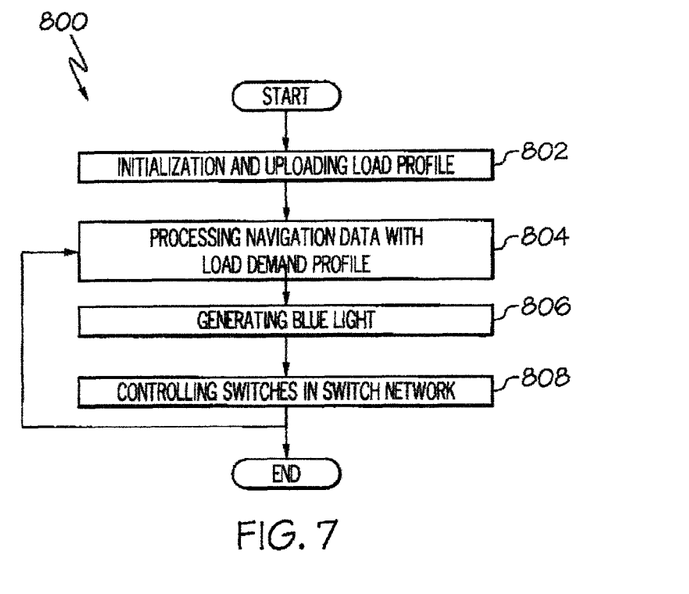
FIG. 7 is a flow chart for a method associated with an ALS, in accordance with herein described embodiments.

FIG. 2 depicts a central light source subsystem 103, including a blue light generator 54 and a light generating control unit (LGCU) (FIG. 7, 105). The blue light generator 54 generates blue light. In an embodiment, the blue light generator 54 is a blue laser light generator. The LGCU 105 may control and actuate the blue light generator 54. Output from the central light source subsystem 103 is input to the optical fiber bus 104. Functionally, the OFC bus 104 may comprise at least three optional transmitting elements: a transmitting element 1042 coupled to the red light-head 106, a transmitting element 1044 coupled to the green light-head 110, and a transmitting element 1046 coupled to the white light-head 108. However, the apparatus of the transmitting elements 1042, 1044, and 1046 are interchangeable and there is no need to distinguish them.

Figure 3:
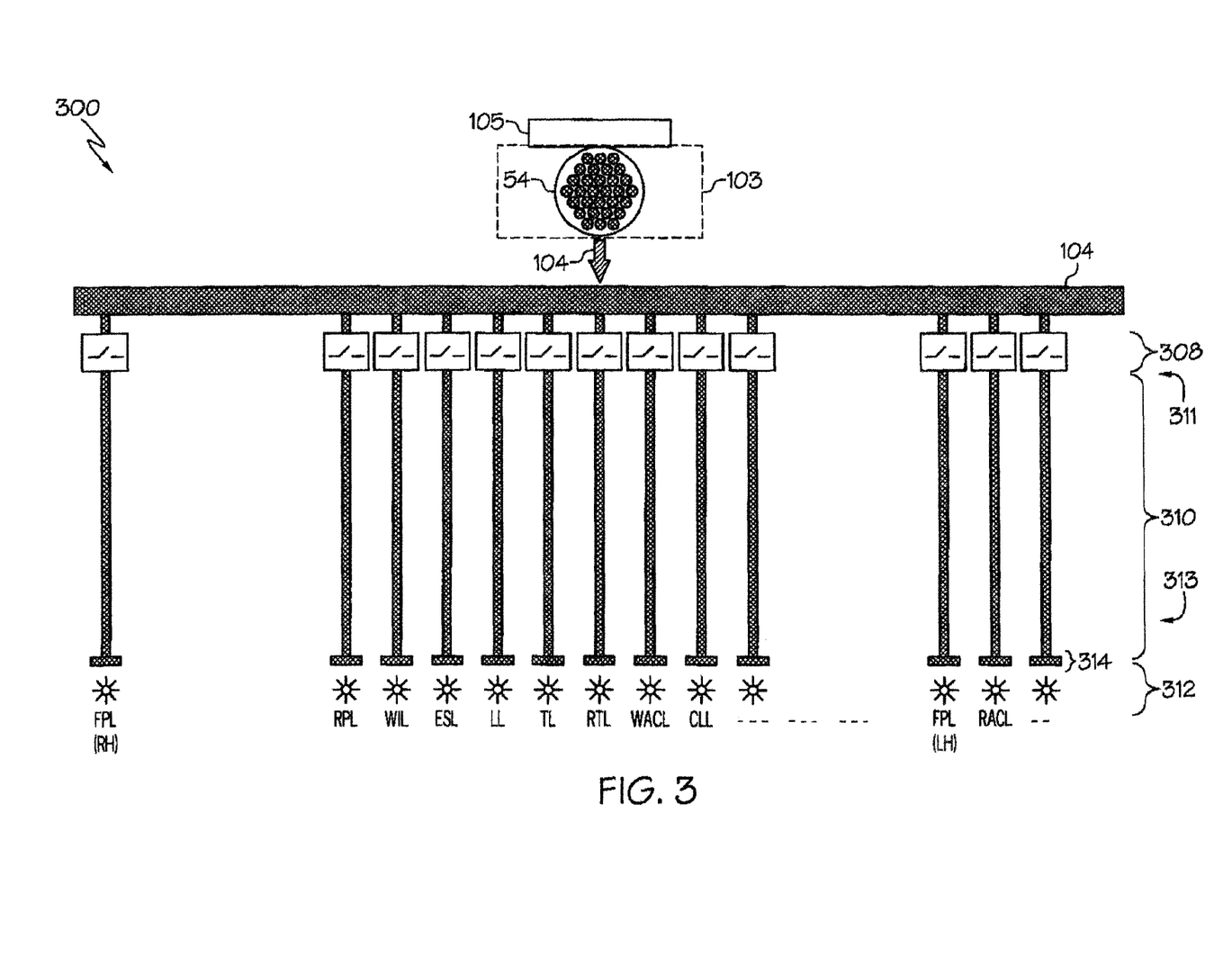
FIG. 3 depicts the central light source of FIG. 2 supplying light to a plurality of passive light-heads, via an optical fiber bus, in accordance with an exemplary embodiment.

A respective plurality (N) of light transmitting elements 310 is shown. The OFC bus 104 and optional transmitting elements operatively couple the passive light-heads 312 to the central light source subsystem 103. In FIG. 3, the system 102 architecture is shown in more detail. OFC bus 104 is shown operationally coupled to a plurality (N) of distributed passive light-heads 312.

In various embodiments, an optional switching network, comprised of a respective plurality (N) of light switches 308 is included. Note from viewing FIG. 3, when the switching network is employed, there is a one to one unique correspondence between a light switch 308, a transmitting element 310, and a passive light-head 312. Each light switch 308 serves as a gate, being operationally coupled between the blue light generator 54 of the central light source subsystem 103 and a first side 311 of an associated one of the plurality of light transmission elements 310. Each light transmission element 310 is operationally coupled on a second side 313 to an associated passive light-head of the plurality of passive light-heads 312. Said differently, the system 102 architecture is operationally coupling each passive light-head 312 of the plurality of passive light-heads 312 to a first side of a respective light switch that is coupled on a second side to an output of the blue light generator 54.

In various embodiments, the operational coupling is achieved with light transmission elements 310 and/or optical fiber cable. Each light switch 308 is controlled by the LGCU 105. The LGCU 105 is coupled to the central light source subsystem 103 and controls each of the light switches 308, the LGCU 105 is programmed to: command the blue light generator 54 to generate blue light in accordance with a light load demand profile (load profile, FIG. 6 600) and command the blue light generator 54 to generate blue light in accordance with input from other on-board systems, such as the navigation system, the sensor system, and a flight management system. Inputs from the other on-board systems may inform the LGCU 105 to modify its control of the ALS 102 to accommodate: energy optimization required during low fuel scenarios, single engine operation scenarios, scenarios where high intensity flashing patterns are required to augment traffic collision avoidance (TCAS) warnings, and the like.

In embodiments that employ an optional switching network 308, the LGCU 105 is programmed to: individually command each of the light switches 308 to move to the open position or to the closed position, in which the switch 308 optically directs the blue light generated by the central light source subsystem 103 to an associated light transmission element.

In Each light switch 308 being responsive to a switch command from the LGCU to move between an open position, in which the switch light optically prevents the blue light from the central light source subsystem 103 from reaching the associated light transmission element 310 (and associated passive light-head 312) and a closed position, in which the switch optically directs the blue light from the central light source subsystem 103 to its associated light transmission element 310 (and associated passive light-head 312).

Each of the plurality of passive light-heads 312 comprises a respective light conversion element 314 (therefore there is a respective plurality of light conversion elements 314) and at least one of the plurality light conversion elements 314 converts blue light to aviation green light (green light conversion element 116), at least one of the plurality of light conversion elements converts blue light to aviation red light (red light conversion element 112), and at least one of the plurality of light conversion elements converts blue light to aviation white light (white light conversion element 114). In an embodiment, the green light conversion element 116 includes aluminate based phosphor to convert blue light to green light; the red light conversion element 112 includes nitride based phosphor to convert blue light to red light; and the white light conversion element 114 includes nitride-yttrim aluminum garnet (YAG) based phosphor to convert blue light to white light. In various embodiments, each of the passive light-heads 312 may include optics, such as lenses, for projecting converted light, and the optics may further include lens-tinting or filtering, as required by Aircraft Lights Photometric Requirements, for directing light into a required illumination zone, and to assure that a resulting lumen and flux output and light color is aviation-specific.

Figure 4:
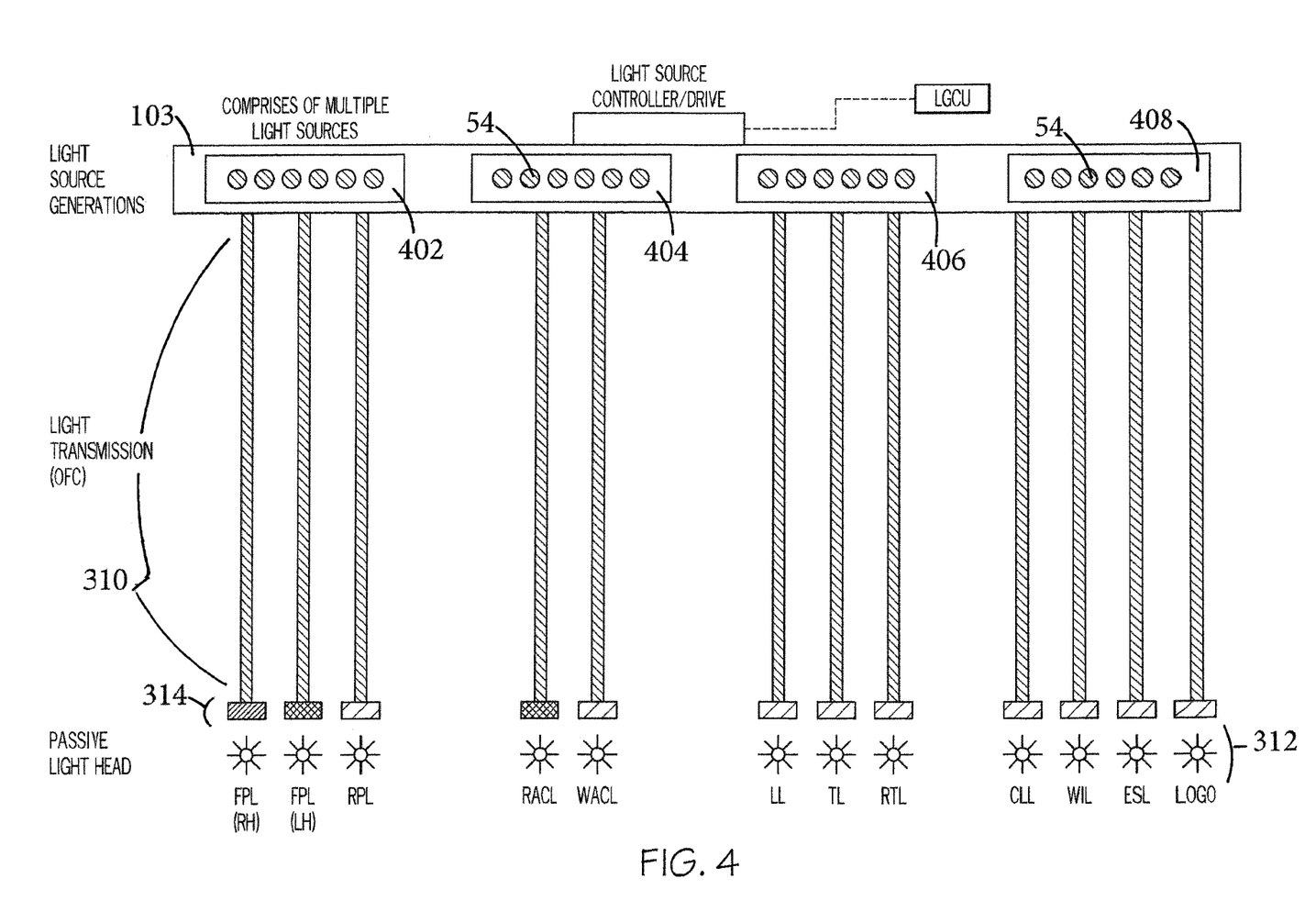
FIG. 4 depicts an embodiment showing distributed subparts of the ALS, in accordance with exemplary embodiments.

In an embodiment, the central light source subsystem 103 may be configured with a single blue light laser diode. In another embodiment, the central light source subsystem 103 may be configured with a plurality of blue light laser diodes. FIG. 4 depicts an embodiment in which blue light generator 54 is one of multiple blue light generators 54, and the central light source subsystem 103 is configured as a number (N) of sub-parts (402, 404, 406, and 408), each uniquely located around the aircraft 100 and having a combination of two or more blue light generators 54. Each coupled to their respective optical fiber cable OFC, transmitting element 1042, 1044, and 1046. In some embodiments, the light is transmitted via a respective collimator.

Figure 5:
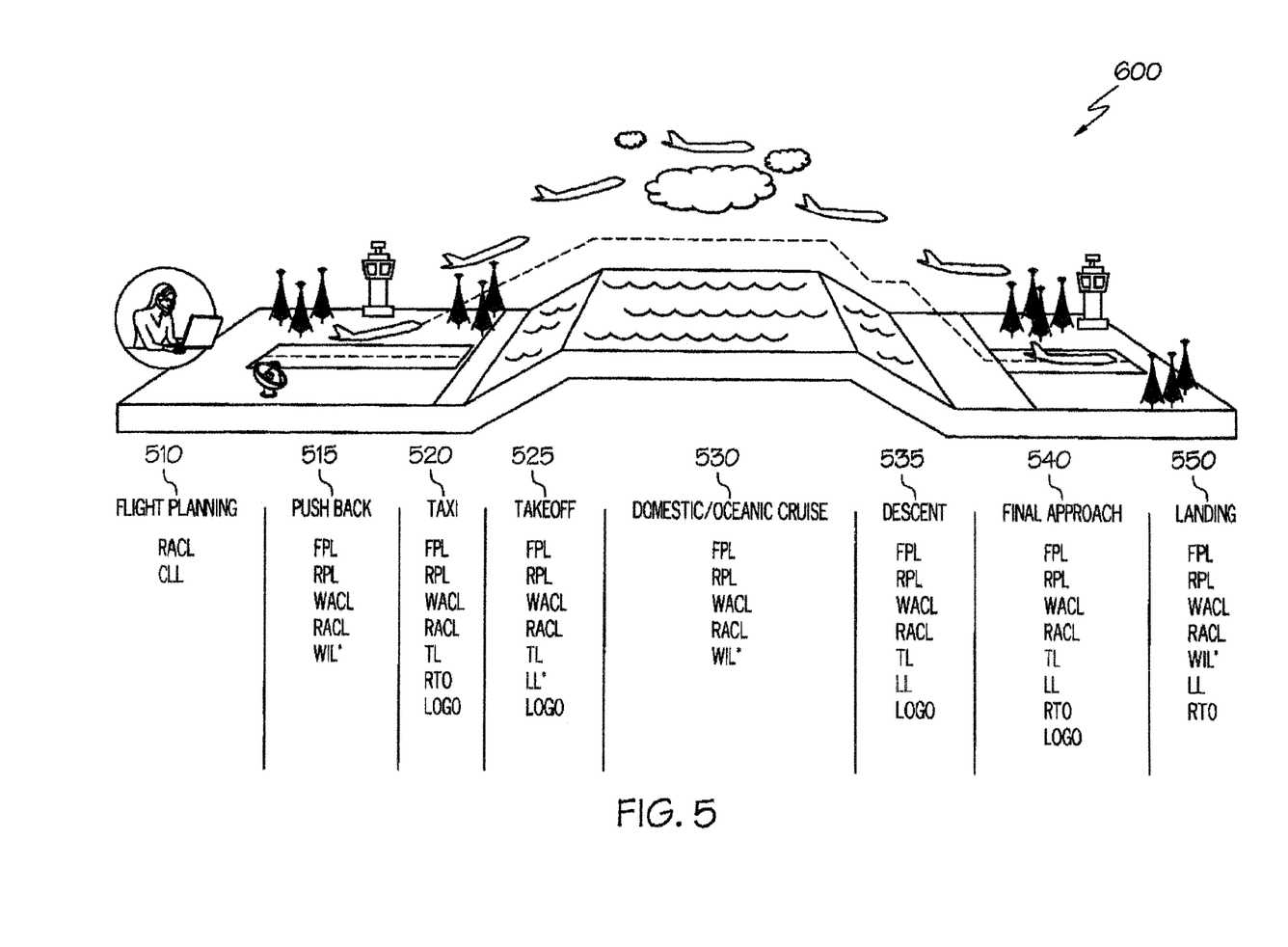
FIG. 5 illustrates a diagram of a load profile of aircraft passive light-heads of the LH/RH aircraft lighting system at various aircraft flight phases in accordance with herein described embodiments.

As may be appreciated, the various passive light-heads 312 are intended to light up at different times, based on aircraft operations and flight phases; further, aviation rules may dictate flux and intensity levels for the light heads during aircraft operations and flight phases. When a passive light-head is lighted, its switch 408 is necessarily closed, and passive light-head 312 is a passive load on the ALS 102. Accordingly, an exemplary light load demand profile (load profile) for the passive light-heads 312 can be generated for aviation specific lighting requirements during the operation of the aircraft 100. FIG. 5 illustrates an exemplary load profile 600 for the aircraft lighting system 102 at various aircraft flight phases, in accordance with herein described embodiments. A list of acronyms for aircraft lights is as follows: "RACL" are the Red Anti Collision Lights; "CLL" are the Cargo Loading Lights; "FPL" are the Forward Position Lights; "RPL" are the Rear Position Lights; "WACL" are the White Anti-Collision lights; "WIL" are the Wing illumination Lights; "TL" are the Taxi Lights; "LL" are the Landing Lights; "LOGO" are the Logo Lights; and "RTO" are the Runway Turnoff Lights.

As mentioned, load profiles can vary according to operator's preferences. In FIG. 5, the exemplary load profile 600 shows which passive lights to light up during each flight segment or flight phase, including: for the flight planning 510, passive lights: "RACL", "CLL"; for the push back 515, passive lights: "FPL", "RPL", WACL", "RACL", "WIL"; for the taxi 520, passive lights: "FPL", "RPL", WACL", "RACL", "TL", "RTO"; and "logo"; for the takeoff 525, passive lights: "FPL", "RPL", WACL", "RACL", "TL", "LL"; and "logo"; for the domestic/oceanic cruise 530, passive lights: "FPL", "RPL", WACL", "RACL", and "WIL"; for the descent 535, passive lights: "FPL", "RPL", WACL", "RACL", "TL", "LL"; and "logo"; for the final approach 540, passive lights: "FPL", "RPL", WACL", "RACL", "TL", "LL"; "RTO", and "logo"; and for the landing 550, the passive lights: "FPL", "RPL", WACL", "RACL", "WIL", "LL"; and "RTO".

The LGCU 105 uploads the pre-defined load profile 600. During operation, the LGCU 105 monitors navigation data and matches and/or optimizes the passive loads of the passive light-heads for each of the flight phases: flight planning 510, push back 515, taxi 520, takeoff 525, domestic/oceanic cruise 530, descent 535, final approach 540, and landing 550 with a set of configurations set by modes of operation based on the particular or expected aircraft flight phase. The LGCU 105, during operation of the aircraft 100, balances the lumen demands and provides only the lumens needed to each individual passive light-head 314 of the plurality of passive light-heads 314, for each flight phase. Additionally, in various exemplary embodiments, the LGCU 105 can be programmed for predictive, expected, and/or reactive operation of the passive light-heads 312, and for a variety of operating modes, to ensure optimum luminance control. The provided ALS 102, therefore, generates appropriate flux and intensity levels for the passive light-heads, and capably corrects/adjusts levels of flux and intensity during operation, resulting in an increased life expectance and cost savings over conventional aircraft lighting systems.

Figure 6:
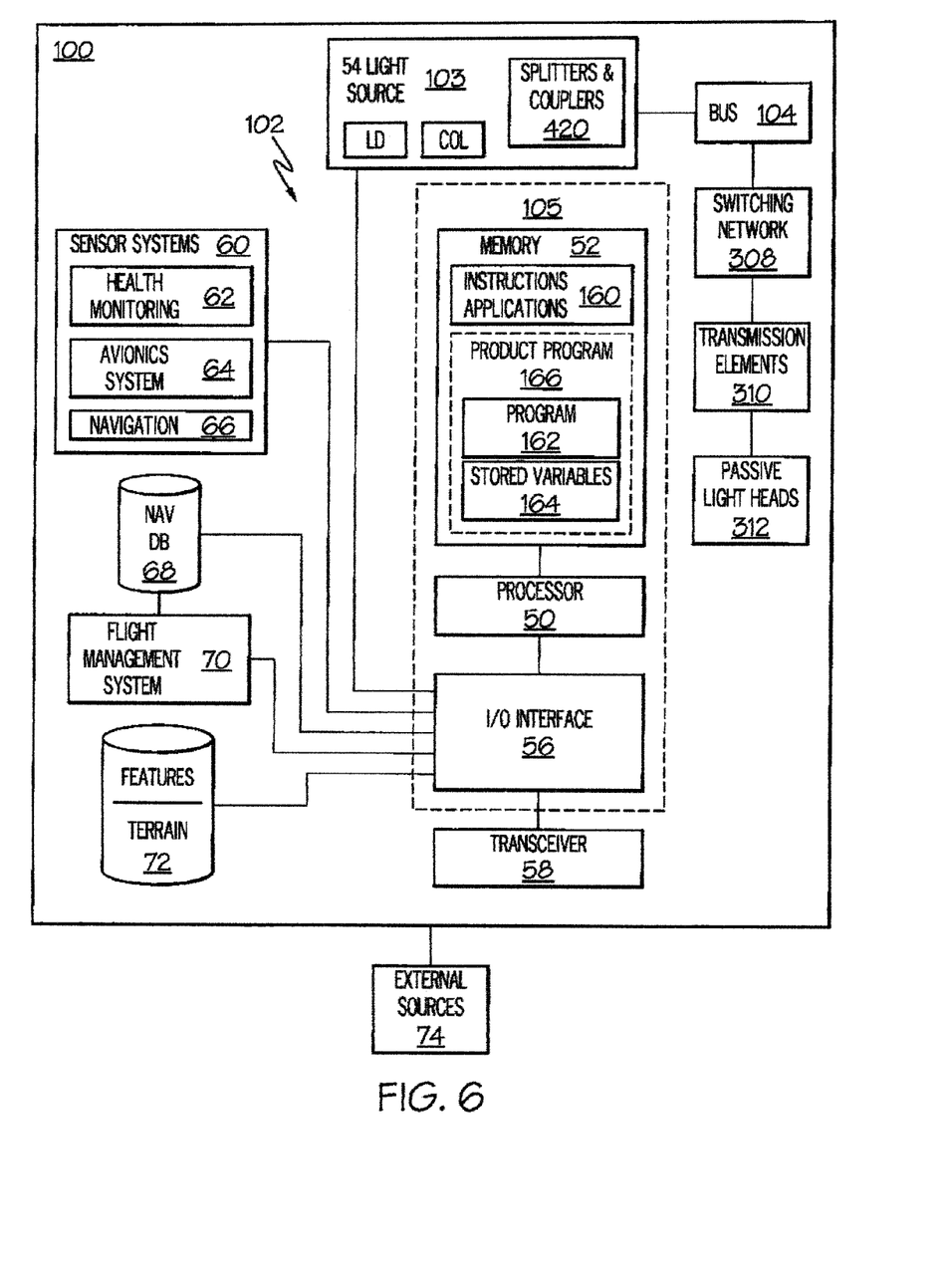
FIG. 6 is a functional block diagram of the aircraft lighting system of FIG. 1, providing more detail.

Turning now to FIG. 6, in various embodiments, the system 102 embodies a processor 50 and storage location or memory 52 (which can be depicted in a functional form as an "enhanced computer system"). In some embodiments, the processor 50—memory 52 coupling is the LGCU 105, which may be integrated within a preexisting mobile platform management system, avionics system, cockpit display system (CDS), flight controls system (FCS), or aircraft flight management system (FMS 70). Optionally, the LGCU 105 may exist in an optional electronic flight bag (EFB). Further, in some embodiments, LGCU 105 may reside in a portable electronic device (PED) such as a tablet, cellular phone, or the like.

The processor 50 performs the processing functions of the system 102. To perform these functions, the processor 50 may be operatively coupled to any combination of the following aircraft systems: sensor systems 60 (including a source of avionics systems data, such as avionics system 64, a source of health monitoring system data 62; a source of real-time aircraft status data, such as a navigation system 66) a source of prescribed flight plan data, such as a navigation database (NavDB 68); an input/output (I/O) interface 56; a transceiver 58; one or more databases 72; and a flight management system (FMS 70). The processor 50 may generate blue light in accordance with input from various on-board systems, including the navigation system, the sensor systems, the flight management system, and the like. The functions of these aircraft systems, and their interaction, are described in more detail below.

The navigation system 66 is configured to provide real-time navigation data and/or information regarding operation of the aircraft 100. As used herein, "real-time" is interchangeable with current and instantaneous. The navigation system 66 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS 70, as will be appreciated in the art. The data provided by the navigation system 66 is referred to as navigation data (also referred to herein as aircraft status data). Aircraft status data may include any of: an instantaneous position (e.g., the latitude, longitude, orientation), a flight path angle, a vertical speed, a ground speed, an instantaneous altitude (or height above ground level), an instantaneous heading of the aircraft 100 (i.e., the direction the aircraft is traveling in relative to some reference), and a current phase of flight. The real-time aircraft status data, or navigation data, is made available such that the processor 50, may further process and/or handle the aircraft status data.

Prescribed flight plan data may include a series of intended geospatial midpoints between a departure and an arrival, as well as performance data associated with each of the geospatial midpoints (the performance data including intended navigation data such as intended airspeed, intended altitude, intended acceleration, intended flight path angle, and the like). A source of a prescribed flight plan data may be a storage location or a user input device. In various embodiments, the NavDB 68 is the source of a prescribed flight plan. The navigation database (NavDB 68) is a storage location that may also maintain a database of flight plans, and/or information regarding terrain and airports and/or other potential landing locations (or destinations) for the aircraft 100. In operation, the navigation system 66 and the NavDB 68 may be integrated with a FMS 70.

In various embodiments, the avionics system(s) 64 provide aircraft performance data and feedback for subsystems on the aircraft 100. Examples of the aircraft performance data include: engine thrust level, fuel level, braking status, temperature control system status, and the like. As may be appreciated, the avionics system(s) 64 may therefore include a variety of on-board detection sensors, and, as part of the sensor systems 60, may be operationally coupled to the FMS 70.

In various embodiments, the FMS 70, in cooperation with the sensor systems 60 and the NavDB, provides real-time flight guidance for aircraft 100. The FMS 70 is configured to compare the instantaneous position and heading of the aircraft 100 with a prescribed flight plan for the aircraft 100. To this end, in various embodiments, the NavDB 68 supports the FMS 70 in maintaining an association between a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like). In various embodiments, the FMS 70 also supports controller pilot data link communications (CPDLC), such as through an aircraft communication addressing and reporting system (ACARS) router; this feature may be referred to as a communications management unit (CMU) or communications management function (CMF). Accordingly, in various embodiments, the FMS 70 may be a source for the real-time aircraft status data of the aircraft 100.

External sources 74 communicate with the aircraft 100, generally by way of transceiver 58. External sources include: weather and surface data sources, such as a source for meteorological terminal aviation weather reports (METARS), automatic terminal information service (ATIS), datalink ATIS (D-ATIS), automatic surface observing system (ASOS); traffic data system(s); air traffic control (ATC); and a variety of other radio inputs. The traffic data system(s) may include numerous systems for providing real-time neighbor/relevant traffic data and information. For example, traffic data sources may include any combination of: traffic collision avoidance system (TCAS), automatic dependent surveillance broadcast (ADS-B), traffic information system (TIS), crowd sourced traffic data and/or another suitable avionics system. Flight traffic information that is received from the traffic data system may include, for each neighbor aircraft of a plurality of neighbor aircraft, one or more of a respective (i) instantaneous position and location, vertical speed, and ground speed, (ii) instantaneous altitude, (iii) instantaneous heading of the aircraft, and (iv) aircraft identification.

The transceiver 58 is configured to support instantaneous (i.e., real time or current) communications between the aircraft 100 and the one or more external data source(s) 74. As a functional block, the transceiver 58 represents one or more transmitters, receivers, and the supporting communications hardware and software required for the system 102 to communicate with the various external data source(s) 4 as described herein. In an example, the transceiver 58 supports bidirectional pilot-to-ATC (air traffic control) communications via a datalink. In addition to supporting the data link system, the transceiver 58 is configured to include or support an automatic dependent surveillance broadcast system (ADS-B), a communication management function (CMF) uplink, a terminal wireless local area network (LAN) unit (TWLU), or any other suitable radio communication system that supports communications between the aircraft 100 and the various external source(s) 74. In this regard, the transceiver 58 may allow the aircraft 100 to receive information that would otherwise be unavailable to the pilot and/or co-pilot using only the onboard systems.

In various embodiments, the processor 50 is additionally operationally coupled to one or more databases 72. The databases 72 may include an airport features database, having therein maps and geometries, as well as airport status data for the runways and/or taxi paths at the airport; the airport status data indicating operational status and directional information for the taxi paths (or portions thereof). Additionally, the databases 72 may include a terrain database, having therein topographical information for the airport and surrounding environment.

In FIG. 6, the LGCU 105 is depicted as an enhanced computer system. The processor 50 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 52 may comprise RAM memory, ROM memory, flash memory, registers, a hard disk, or another suitable non-transitory short or long-term storage media capable of storing computer-executable programming instructions or other data for execution. The memory 52 may be located on and/or co-located on the same computer chip as the processor 50. Generally, the memory 52 maintains data bits and may be utilized by the processor 50 as storage and/or a scratch pad during operation. Specifically, the memory 52 stores instructions and applications 160. Information in the memory 52 may be organized and/or imported from an external data source during an initialization step of a process; it may also be programmed via a user input device.

The novel program 162 includes rules and instructions which, when executed, cause the processor 50 to perform the functions, techniques, and processing tasks associated with the operation of the system 102. Novel program 162 and associated stored variables 164 may be stored in a functional form on computer readable media, as depicted, in memory 52. While the depicted exemplary embodiment is described in the context of a fully functioning computer system, those skilled in the art will recognize that the mechanisms of the present disclosure are capable of being distributed as a program product 166, with one or more types of non-transitory computer-readable signal bearing media used to store the program and the instructions thereof and carry out the distribution thereof, such as a non-transitory computer readable medium bearing the program 162 and containing computer instructions stored therein for causing a computer processor (such as the processor 50) to perform and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

During general aircraft operation, the processor 50 may load and execute one or more programs, algorithms and rules embodied as instructions and applications 160 and perform tasks and operations attributed herein to the general operation of the aircraft 100. In specifically executing the tasks and processes attributed to the system 102, the processor 50 loads the instructions, algorithms, and rules embodied in the program 162, thereby being programmed with program 162. During execution of program 162, the processor 50 performs the processing activities of the system 102.

In various embodiments, the LGCU 105 may be communicatively coupled to the input/output (I/O) interface 56. The communicative coupling may be by any suitable physical or logical means of connecting computer systems and components, including, but not limited to, direct hard-wired connections, fiber optics, infrared and wireless bus technologies, to the input/output (I/O) interface 56.

The I/O interface 56 enables communications between the processor 50 and other system 102 components, and between the processor 50 and the external sources 74 via the transceiver 58. The I/O interface 56 may include one or more network interfaces and can be implemented using any suitable method and apparatus. In various embodiments, the I/O interface 56 is configured to support communication from an external system driver and/or another computer system. Also, in various embodiments, the I/O interface 56 may support communication with technicians, and/or one or more storage interfaces for direct connection to memory 52. In one embodiment, the I/O interface 56 is integrated with the transceiver 58 and obtains data from external data source(s) 74 directly.

Referring now to FIG. 7 and with continued reference to FIGS. 1-6, a flow chart is provided for a method 800 for the ALS 120, in accordance with various exemplary embodiments. For illustrative purposes, the following description of method 700 may refer to elements mentioned above in connection with FIGS. 1-6. In practice, portions of method 700 may be performed by different components of the described system. It should be appreciated that method 700 may include any number of additional or alternative tasks, the tasks shown in FIG. 7 need not be performed in the illustrated order, and method 700 may be incorporated into a more comprehensive procedure or method having additional functionality not described in detail herein. Moreover, one or more of the tasks shown in FIG. 7 could be omitted from an embodiment of the method 700 if the intended overall functionality remains intact.

The method starts, and at 802 the LGCU 105 is initialized. As mentioned above, initialization may comprise uploading or updating instructions and applications 160, program 162, stored variables 164, such as the pre-defined load profile, and the like. Initialization at 802 may also include identifying external sources 74 and/or external signals and the communication protocols to use with each of them.

At 804, the LGCU 105 receives prescribed flight plan data and aircraft navigation data (including location, speed, and phase of flight) and processes this data with the light load demand profile. During operation, it is understood that aircraft navigation data is continuously received and processed. As mentioned, in various exemplary embodiments, the LGCU 105 can be programmed for predictive, expected, and/or reactive operation of the passive light-heads 312, and for a variety of operating modes, to ensure optimum luminance control; in various embodiments, this implies processing FMS data and other on-board avionics data with the load profile.

At 806, the LGCU 105 commands the blue light generator to generate blue light. At 808, the LGCU 105 controls the individual switches 308 in the switching network 308 as a function of the load profile and the navigation data. Additionally, the LGCU 105 may monitor navigation data and optimize passive loads caused by the passive light-heads 312 for each of the flight phases as a function of a current flight phase. After operation 808, the method 800 may return to 804 or end.

Thus, technologically improved aircraft lighting systems comprising a centralized blue light aircraft lighting system 102 and a plurality of distributed passive light-heads at various aircraft locations are provided. As is readily appreciated, the above examples of the system 102 are non-limiting.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from the set including A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft lighting system (ALS) for an aircraft, comprising:
    a central light source subsystem including a blue light generator, the blue light generator controlled by a light generator control unit (LGCU);
    a plurality of passive light heads, distributed around the aircraft, and a respective plurality of light transmission elements;
    each light transmission element operationally coupled on a first side to the blue light generator;
    each light transmission element operationally coupled on a second side to an associated passive light head of the plurality of passive light heads;
    wherein the LGCU is coupled to the central light source subsystem and the LGCU configured to: command the blue light generator to generate blue light in accordance with an aircraft load profile and to generate blue light in accordance with input from other on-board systems, including a navigation system, a sensor system, and a flight management system;
    wherein each of the plurality of passive light heads comprises a respective light conversion element, and each light conversion element performs one of: converting received blue light to aviation green light, converting received blue light to aviation red light, and converting received blue light to aviation white light.

2. The system of claim 1, wherein the central light source subsystem comprises multiple blue light generators, each blue light generator optically coupled to supply blue light to one or more exterior aircraft lighting sub-systems, from among: position lights, anti-collision lights, High power Flood lights, Medium power flood lights, and Low Power Flood lights; and wherein the LGCU controls the multiple blue light generators.

3. The system of claim 1, further comprising:
a respective plurality of light switches;
each light switch operationally coupled between the central light source subsystem and an associated first side of one of the plurality of light transmission elements;
each light switch responsive to a switch command from the LGCU to move between an open position, in which the switch optically prevents light from the central light source subsystem from reaching the associated light transmission element, and a closed position; and
the LGCU is further configured to command each of the light switches to move to the open position or to the closed position, whereby the light generated by the central light source subsystem is selectively supplied to at least one of the passive light heads.

4. The system of claim 1, wherein the light transmission elements are optical fiber cables.

5. The system of claim 1, wherein the blue light generator includes a blue laser diode.

6. The system of claim 1, wherein the Green light conversion element include phosphor which will convert the blue light into Aviation Green, the Red light conversion element includes phosphor which will convert the blue light into Aviation Red, and the White light conversion element includes phosphor which will convert the blue light into Aviation White.

7. The system of claim 1, wherein the passive light heads further include optics for directing light into a required illumination zone in accordance with Aircraft Lights Photometric Requirements.

8. The system of claim 1, wherein the LGCU interfaces a Flight Management System (FMS) and optimizes blue light generation in accordance with an aircraft phase of flight.

9. A method for aircraft lighting system (ALS) in an aircraft, comprising:
locating a central light source subsystem including a blue light generator and a light generating control unit (LGCU) comprising a processor, on the aircraft;
distributing a plurality of passive light-heads around an external surface of the aircraft;
operationally coupling a light transmission element on a first side to the blue light generator;
operationally coupling each light transmission element on a second side to a passive light head of the plurality of passive light heads;
coupling the LGCU to the central light source subsystem;
uploading a load profile needed for the functionality of passive light-heads into the LGCU;
receiving navigation data and processing it with the load profile in the LGCU;
commanding, by the LGCU, as a function of the load profile and data from aircraft on-board systems, the blue light generator to generate blue light; and
wherein each of the plurality of passive light heads comprises a respective light conversion element, converting, by at least one of the light conversion elements, received blue light to aviation green light, converting, by at least one of the light conversion elements, received blue light to aviation red light, and converting, by at least one of the light conversion elements, received blue light to aviation white light.

10. The method of claim 9, wherein the blue light generator is one of multiple blue light generators in the central light source subsystem, further comprising:
optically coupling each blue light generator to supply blue light to one or more exterior aircraft lighting sub-systems, from among: position lights, anti-collision lights, High power Flood lights, Medium power flood lights, and Low Power Flood lights; and
wherein the LGCU controls the multiple blue light generators.

11. The method of claim 10, further comprising:
operationally coupling a light switch between the central light source subsystem and an associated first side of a respective one of the plurality of light transmission elements; and
commanding, by the LGCU, each light switch to move between an open position, in which the switch optically prevents light from the central light source subsystem from reaching the associated light transmission element, and a closed position, in which the switch optically directs the light from the central light source subsystem to the associated light transmission element.

12. The method of claim 11, wherein the light transmission elements are optical fiber cables.

13. The method of claim 12, wherein the blue light generator includes a blue laser diode.

14. The method of claim 13, wherein the Green light conversion element includes phosphor, the Red light conversion element includes phosphor, and the White light conversion element includes phosphor.

15. The method of claim 13, wherein the passive light heads further include optics for directing light into a required illumination zone in accordance with Aircraft Lights Photometric Requirements.

16. The method of claim 13, wherein the LGCU interfaces with a Flight Management System (FMS) and optimizes blue light generation in accordance with an aircraft phase of flight.

17. The method of claim 10, further comprising:
monitoring navigation data, by the LGCU; and
optimizing passive loads of the passive light-heads for each of the flight phases, as a function of the load profile and navigation data, by the LGCU.

18. An aircraft lighting system (ALS) for an aircraft, comprising:
a blue light generator of a central light source subsystem located on the aircraft;
a plurality (N) of passive light-heads, distributed around the aircraft;
N light transmission elements;
N light switches, each of the N light switches operationally coupled between the central light source subsystem and a respective one of the N light transmission elements, at a first side of the light transmission element;
each of the N light transmission elements operationally coupled on a second side to a respective one of the N passive light-heads;
a light generating control unit (LGCU) coupled to the blue light generator, comprising a processor, and programmed to:
control the blue light generator; and generate, as a function of a load profile, independent switch commands for the N light switches, the switch commands cause each of the N light switches to move between an open position, in which the light switch optically prevents light from the central light source subsystem from reaching the associated light transmission element, and a closed position, in which the switch optically directs the blue light from the central light source subsystem to the associated light transmission element; and wherein each of the N passive light-heads comprises a respective light conversion element, and at least one of the light conversion elements converts blue light to aviation green light, at least one of the plurality of light conversion elements converts blue light to aviation red light, and at least one of the plurality of light conversion elements converts blue light to aviation white light.

19. The system of claim 18, wherein the LGCU monitors navigation data and optimizes passive loads of the passive light-heads for each of the flight phases as a function of a current flight phase.

20. The system of claim 18, wherein the N light transmission elements are optical fiber cables.

* * * * *